United States Patent
Bowen et al.

(10) Patent No.: US 12,387,616 B2
(45) Date of Patent: Aug. 12, 2025

(54) METHOD FOR CONVERSATION SIMULATION

(71) Applicant: FMR LLC, Boston, MA (US)

(72) Inventors: Elizabeth Bowen, Andes, NY (US); Dean Biele, Lowell, MA (US); Sean Cawley, Providence, RI (US)

(73) Assignee: FMR LLC, Boston, MA (US)

( * ) Notice: Subject to any disclaimer, the term of this patent is extended or adjusted under 35 U.S.C. 154(b) by 12 days.

(21) Appl. No.: 18/210,345

(22) Filed: Jun. 15, 2023

(65) Prior Publication Data
US 2024/0420584 A1 Dec. 19, 2024

(51) Int. Cl.
*G09B 7/00* (2006.01)
*G06Q 30/015* (2023.01)
*G09B 5/04* (2006.01)

(52) U.S. Cl.
CPC ............ *G09B 5/04* (2013.01); *G06Q 30/015* (2023.01)

(58) Field of Classification Search
CPC ........... G09B 7/02; G09B 7/05; G06Q 30/015
See application file for complete search history.

(56) References Cited

U.S. PATENT DOCUMENTS

| | | | | |
|---|---|---|---|---|
| 9,524,650 | B2* | 12/2016 | Yavari | G09B 5/04 |
| 2007/0071206 | A1* | 3/2007 | Gainsboro | H04M 3/42221 379/168 |
| 2019/0109803 | A1* | 4/2019 | Akkiraju | G09B 5/02 |
| 2019/0251859 | A1* | 8/2019 | Xu | G09B 7/02 |
| 2020/0111377 | A1* | 4/2020 | Truong | G10L 15/26 |
| 2020/0151394 | A1* | 5/2020 | Mont-Reynaud | G10L 13/00 |
| 2021/0174691 | A1* | 6/2021 | Dill | G09B 5/065 |
| 2023/0080724 | A1* | 3/2023 | Stoops | G09B 7/02 |

\* cited by examiner

*Primary Examiner* — Peter R Egloff
(74) *Attorney, Agent, or Firm* — Cesari and McKenna, LLP

(57) ABSTRACT

A method for customer service representative training via a conversation with a simulated customer includes: receiving a profile of a simulated customer; causing display of the profile of the simulated customer; generating a plurality of textual prompts associated with the simulated customer and based on the profile of the simulated customer; generating a plurality of audio prompts associated with the simulated customer, each one corresponding to one of the textual prompts; playing each one of the plurality of audio prompts. The method also includes receiving a plurality of audio responses associated with the customer service representative, each one in response to a corresponding one of the audio prompts; generating a plurality of textual responses associated with the customer service representative, each one corresponding to one of the audio responses; storing the plurality of textual prompts and the plurality of textual responses in a database.

18 Claims, 7 Drawing Sheets

METHOD FOR CONVERSATION SIMULATION

BACKGROUND

Technical Field

The present invention relates to conversation simulation, and more particularly to customer service representative training via a conversation with a simulated customer.

Background

Customer service representatives require training to be able to assist customers efficiently and correctly. Such training may be given when a representative is newly hired, but also periodically after the initial training to maintain the representative's skill set. Customer service representatives may be trained by more senior representatives, but also by other trainers, managers, or peers. For example, a newly hired customer service representative who needs to be trained on 3 to 5 scenarios per week requires about 3 hours per week of a more senior representative's time. For a class of 20 newly hired representatives, this amounts to 60 hours of training time that the senior representative may have otherwise spent assisting customers. In addition, trainers and/or managers may also spend time training the class. A more efficient way of training customer service representatives is needed.

SUMMARY

The deficiencies of the prior art are overcome by providing a method for customer service representative training that significantly reduces the number of hours spent by senior representatives, trainers, and managers on training individuals. In accordance with an embodiment of the present invention a computer-implemented method for customer service representative training via a conversation with a simulated customer using a computer system associated with a customer service representative, a chat engine, a text-to-speech engine, and a speech-to-text engine, wherein the computer system, the chat engine, the text-to-speech engine, and the speech-to-text engine are coupled to a communications network, includes receiving, by the computer system, a profile of a simulated customer. The method includes causing display, by the computer system, of the profile of the simulated customer. The method further includes generating, by the chat engine, a plurality of textual prompts associated with the simulated customer and based on the profile of the simulated customer. The method also includes generating, by the text-to-speech engine, a plurality of audio prompts associated with the simulated customer, each one of the plurality of audio prompts corresponding to one of the plurality of textual prompts. The method includes playing, by the computer system, each one of the plurality of audio prompts. The method also includes receiving, by the computer system, a plurality of audio responses associated with the customer service representative, wherein each one of the plurality of audio responses is received in response to a corresponding one of the plurality of audio prompts. The method includes generating, by the speech-to-text-engine, a plurality of textual responses associated with the customer service representative, wherein each one of the plurality of textual responses corresponds to one of the plurality of audio responses. The method further includes storing the plurality of textual prompts and the plurality of textual responses in a database.

Alternatively, or in addition, the profile of the simulated customer is based on one or more profiles of existing customers. The profile of the simulated customer may be displayed by a customer management system running on the computer system. The customer management system may also be configured to display profiles of existing customers.

Also alternatively, or in addition, the text-to-speech engine is based on a machine learning model. The chat engine may be based on a combination of a machine learning model and natural language processing.

Alternatively, or in addition, the method further includes storing, by the computer system in the database, feedback associated with the customer service representative and based on the plurality of textual prompts and the plurality of textual responses. The method may further include causing display, by the computer system, of the feedback in real-time immediately after a conclusion of the conversation.

Further alternatively, or in addition, the method further includes providing a text analysis engine based on a machine learning model and coupled to the communications network. The method also further includes analyzing, by the text analysis engine, the plurality of textual responses. The analysis may include an analysis of word choices, and further comprising causing display, by the computer system, feedback associated with the customer service representative and based on the analysis of word choices. At least one of the plurality of textual prompts may further be based on a preceding one of the plurality of textual responses.

In accordance with another embodiment of the present invention, a system for customer service representative training via a conversation with a simulated customer using a chat engine, a text-to-speech engine, and a speech-to-text engine, wherein the chat engine, the text-to-speech engine, and the speech-to-text engine are coupled to a communications network, includes a computer system associated with a customer service representative. The computer system is coupled to the communications network and has a processor coupled to memory. The processor is configured to receive a profile of a simulated customer and cause display of the profile of the simulated customer. The processor is also configured to receive, from the text-to-speech engine, a plurality of audio prompts associated with the simulated customer generated by the text-to-speech engine, wherein each one of the plurality of audio prompts corresponds to one of a plurality of textual prompts associated with the simulated customer and generated by the chat engine based on the profile of the simulated customer. The processor is configured to play each one of the plurality of audio prompts. The processor further is configured to receive a plurality of audio responses associated with the customer service representative, wherein each one of the plurality of audio responses is received in response to a corresponding one of the plurality of audio prompts. The processor is configured to store the plurality of textual prompts and a plurality of textual response in a database, wherein the textual responses are associated with the customer service representative and have been generated by the speech-to-text-engine, and wherein each one of the textual responses corresponds to one of the plurality of audio responses.

Alternatively, or in addition, the profile of the simulated customer is based on one or more profiles of existing customers. The profile of the simulated customer may be displayed by a customer management system running on the computer system. The customer management system may also be configured to display profiles of existing customers.

Also alternatively, or in addition, the text-to-speech engine is based on a machine learning model. The chat engine may be based on a combination of a machine learning model and natural language processing.

Alternatively, or in addition, the processor is further configured to store, in the database, feedback associated with the customer service representative and based on the plurality of textual prompts and the plurality of textual responses. The processor may further be configured to cause display of the feedback in real-time immediately at a conclusion of the conversation.

Further alternatively, or in addition, the system further includes a text analysis engine coupled to the communications network and based on a machine learning model. The text analysis engine is configured to analyze the plurality of textual responses. At least one of the plurality of textual prompts may further be based on a preceding one of the plurality of textual responses.

In accordance with yet another embodiment of the present invention, a non-transitory computer-readable medium has software encoded thereon. The software, when executed by one or more processors, is operable to receive, by a computer system associated with a customer service representative, a profile of a simulated customer. The software is operable to cause display, by the computer system, of the profile of the simulated customer. The software also is operable to generate, by a chat engine, a plurality of textual prompts associated with the simulated customer and based on the profile of the simulated customer. The software further is operable to generate, by a text-to-speech engine, a plurality of audio prompts associated with the simulated customer, each one of the plurality of audio prompts corresponding to one of the plurality of textual prompts. The software is operable to play, by the computer system, each one of the plurality of audio prompts. The software also is operable to receive, by the computer system, a plurality of audio responses associated with the customer service representative, wherein each one of the plurality of audio responses is received in response to a corresponding one of the plurality of audio prompts. The software further is operable to generate, by the speech-to-text-engine, a plurality of textual responses associated with the customer service representative, wherein each one of the plurality of textual responses corresponds to one of the plurality of audio responses. The software is operable to store the plurality of textual prompts and the plurality of textual responses in a database.

BRIEF DESCRIPTION OF THE DRAWINGS

The description below refers to the accompanying drawings, of which.

DETAILED DESCRIPTION OF ILLUSTRATIVE EMBODIMENTS

Figure 1:
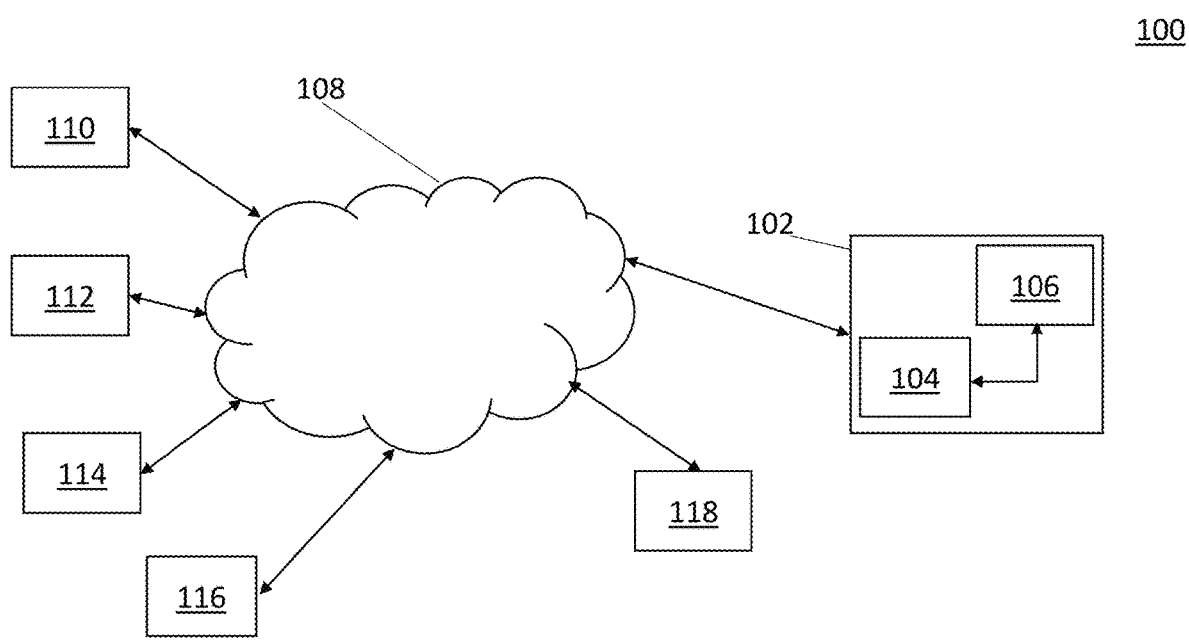
FIG. 1 is an illustration of a system for customer service representative training in accordance with an embodiment of the present invention.

FIG. 1 is an illustration of a system 100 for customer service representative training in accordance with an embodiment of the present invention. System 100 includes a computer system 102. The computer system 102 has a processor 104 coupled to a memory 106. The computer system 102 is also communicatively coupled to a communications network 108. Network 108 may be a public network, such as the internet, or it may be a private network, such as a network internal to a company. Network 108 also may be a combination of public and/or private networks. The computer system 102 may be coupled to the network 108 directly, for example via an Ethernet cable or via wireless connection such as Wi-Fi. Computer system 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The processor 104 is configured to execute the method described below in detail with reference to FIG. 2.

Further coupled to the network 108 are a chat engine 110, a text-to-speech engine 112, a speech-to-text-engine 114, and a database 118. Similar to the computer system, the chat engine 110, text-to-speech engine 112, speech-to-text-engine 114, and database 118 may be coupled to the network 108 directly or indirectly in any way known to the skilled person. In some embodiments, a text analysis engine 116 is also coupled to the network 108. Again, the text analysis engine 116 may be coupled to the network directly or indirectly in any way known to the skilled person.

The chat engine 110 may be a commercial chat engine such as Amazon Lex (Amazon, Seattle, WA), publicly available and described at aws.amazon.com/lex. In that case, the chat engine 110 is executed on a server system operated by the provider of the chat engine and accessible via the network 108. The Amazon Lex chat engine is speech or text based and provides natural language understanding technologies. In speech-based mode, it also provides automatic speech recognition technologies. The Amazon Lex chat engine is based on a machine learning model. Another example of a commercial chat engine is Azure Conversational AI (Microsoft, Redmond, WA), publicly available and described at azure.microsoft.com/en-us/products/bot-services. This chat engine is also executed on a server system operated by its provider and accessible via the network 108. The Azure Conversational AI chat engine is text based and uses a combination of a machine learning model and natural language processing (NLP). Similar to the Amazon Lex engine, it provides natural language understanding technologies. While these two commercial chat engines are described herein, it is expressly contemplated that another chat engine may be utilized. For example, an open-source chat engine such as Bot Libre, publicly available and described at botlibre.com and github.com/BotLibre, may be used. In this case, the chat engine 110 may be executed by the computer system 102, or it may be executed on a different computer system coupled to network 108.

The text-to-speech-engine 112 may be a commercial text-to-speech engine such as Amazon Polly (Amazon, Seattle, WA), publicly available and described at aws.amazon.com/polly. The text-to-speech engine 112 may be based on a machine learning model and is configured to generate natural sounding speech from text. The text-to-speech engine 112 is executed on a server system operated by the provider of the chat engine and accessible via the network 108. In other embodiments, an open-source text-to-speech engine may be used, such as Coqui TTS, publicly available and described at github.com/coqui-ai/TTS. In that case, the text-to-speech engine 112 may be executed by the computer system 102, or it may be executed on a different computer system coupled to network 108.

The speech-to-text engine 114 may be a separate engine, or it may be a part of the chat engine 110. As described above, some chat engines, such as Amazon Lex, include speech-to-text features. In this case, the speech-to-text engine 114 is part of the chat engine 110. The chat engine 110 first generates text from received speech, and then generates a response based on the generated text. In other embodiments, the speech-to-text engine 114 is separate from the chat engine 110, for example if a chat engine is used that does not provide integrated speech-to-text features. A separate speech-to-text engine may be a commercial speech-to-text engine, such as Amazon Transcibe (Amazon, Seattle, WA), publicly available and described at aws.amazon.com/transcribe. In that case, the speech-to-text engine 114 is executed on a server system operated by the provider of the chat engine and accessible via the network 108. In other embodiments, an open-source speech-to-text engine may be used, such as DeepSpeech, publicly available and described at github.com/mozilla/DeepSpeech. In that case, the speech-to-text engine 114 may be executed by the computer system 102, or it may be executed on a different computer system coupled to network 108.

The text analysis engine 116 provides functionality for analyzing text. For example, the text analysis engine 116 may analyze word choices in the text and provide an analysis of these word choices. Illustratively, the analysis may be a sentiment analysis. The text analysis engine may be a commercial text analysis engine such as Amazon Comprehend (Amazon, Seattle, WA), publicly available and described at aws.amazon.com/comprehend. Amazon Comprehend further provides sentiment analysis of the analyzed text and returns the most likely sentiment for the text. Illustratively, the result of the sentiment analysis may be positive (the analyzed text expresses an overall positive sentiment), negative (the text expresses an overall negative sentiment), mixed (the text expressesboth positive and negative sentiments), or neutral (the text expresses neither positive nor negative sentiments). The text analysis engine 116 may also be an open-source text analysis engine such as TextBlob, publicly available and described at textblob.readthedocs.io/en/dev. Other open-source text analysis engines that are publicly available and described are SentiWordNet (github.com/aesuli/SentiWordNet/blob/master/papers/LREC06.pdf) and Vader (github.com/cjhutto/vader-Sentiment), both of which provide sentiment analysis from input text similar to Amazon Comprehend. The text analysis engine 116 may be based on a machine-learning model, it may be based on natural language processing, or on a combination thereof. The text analysis engine 116 may be executed by the computer system 102 or on a different computer system, such as a server hosted by the provider of the text analysis engine. In that case, the different computer system is accessible from the computer system 102 via the network 108.

The database 118 may be provided by any publicly available database system known to the skilled person. It may be a commercial database or an open-source database. The database 118 may be hosted on the computer system 102 or on a separate computer system coupled to the network 108. The database 118 allows the computer system 102 to store and retrieve data.

Figure 2:
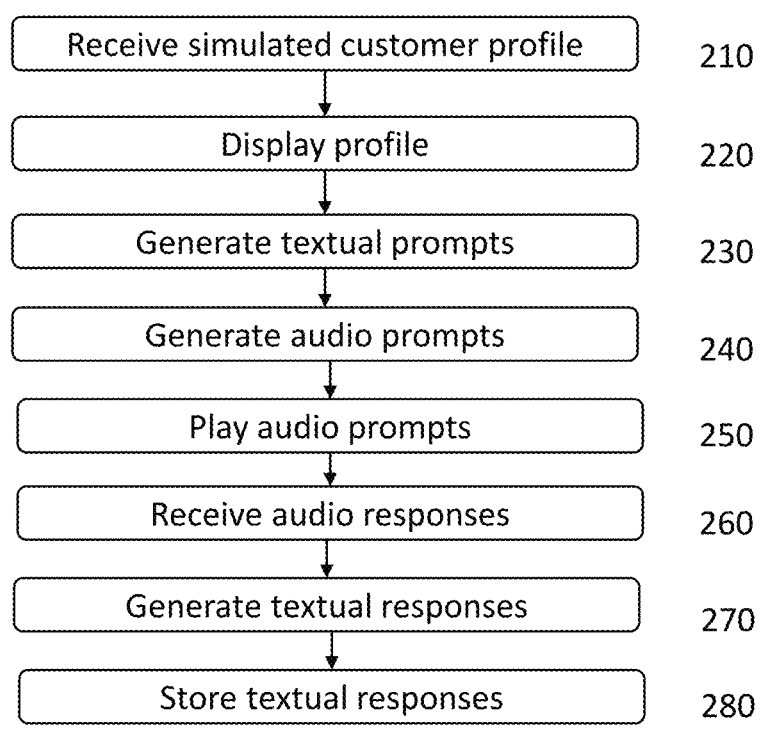
FIG. 2 is a flowchart of a method for customer service representative training in accordance with an embodiment of the present invention.

FIG. 2 is a flowchart of a computer-implemented method 200 for customer service representative training in accordance with an embodiment of the present invention. Specifically, method 200 allows for training a customer service representative via a conversation with a simulated customer. The computer-implemented method 200 may, for example, be executed by a processor of computer system 102 as described above with reference to FIG. 1. Similar to what is described above, the computer system 102 is coupled to a communications network 108. Also coupled to the communications network are a chat engine 110, a text-to-speech engine 112, a speech-to-text engine 114, and a database 118, all as described above. The speech-to-text engine 114 may be a part of the chat engine 110. In some embodiments, a text analysis engine 116 is also coupled to the communications network 108, as described above.

In step 210, the computer system 102 receives a profile of a simulated customer. Exemplarily, the computer system 102 may receive the profile over the network 108, for example from the database 118. The profile may be based on one or more profiles of existing customers. In other cases, the profile of the simulated customer may be selected or generated based on specific training requirements and/or may not be based on profiles of existing customers. The profile of the simulated customer may be associated with a simulated customer name and a picture of the simulated customer. The profile may also include other information related to the simulated customer, such as simulated address information, or simulated account information. In other words, the profile may include any information that the business would normally have access to for any existing actual customer. The profile may further include information that is specific to the simulation of the simulated customer. Illustratively, the profile may include information related to the voice of the simulated customer, the temperament of the simulated customer, or the language and/or accent of the simulated customer. This information may be used by the chat engine 110 and the text-to-speech engine 112 to generate textual prompts and audio prompts as described below.

In step 220, the computer system 102 causes display of the profile of the simulated customer. Illustratively, the computer system 102 may cause display of the profile by a customer management system running on the computer system. The customer management system may be configured to display profiles of existing customers. In other words, the simulated profile may be displayed by the same software that the customer service representative uses to assist existing customers. Alternatively, or in addition, the computer system 102 may cause display of the profile by a dedicated training software or by a software running on a separate computer system accessible via the network 108. The computer system 102 may also cause display of a picture of the simulated customer, by the customer management system and/or by the training software. The picture of the simulated customer may have been generated by an image generation platform such as Synthesia (Synthesia, London, UK), which is publicly available and described at www.synthesia.io.

In step 230, the chat engine 110 generates a plurality of textual prompts associated with the simulated customer and based on the profile of the simulated customer. To this end, the computer system 102 may extract the necessary information from the profile of the simulated customer and transmit this information over the network 108 to the chat engine 110. Illustratively, the computer system 102 may extract the name of the simulated customer and the social security number of the simulated customer and provide this information to the chat engine 110 to generate textual prompts based on this information. In another example, the computer system 102 may extract an account number, account name, and an account balance from the profile of the simulated customer and provide this information to the chat engine 110 to generate textual prompts based on this information. The chat engine 110 then may transmit the generated textual prompts back to the computer system 102 over the network 108. As described above, the chat engine 110 may be based on machine learning model, on natural language processing, or on a combination of a machine learning model and natural language processing.

In addition to being based on the profile of the simulated customer, the generated textual prompts may be generated based on specific parameters provided to the chat engine 110. For example, the textual prompts may be generated based on the training progress of the customer service representative, based on certain business requirements, combination thereof, or any other relevant and suitable parameter known to the skilled person. The textual prompts may also be generated based on a desired conversation intent. For example, the chat engine 110 may be provided with a conversation intent to generate textual prompts for an account balance inquiry. The chat engine 110 may then generate a textual prompt that includes a question from the simulated customer to inquire about one or more of the simulated customer's accounts. The conversation intent provided to the chat engine may include sample utterances that the chat engine 110 may use to generate the textual prompts. Illustratively, a conversation intent to generate textual prompts for an account balance inquiry may include sample utterances related to inquiring about the balance of a checking account, a savings account, an IRA account, a 401(k) account, or a brokerage account. The chat engine 110 may then select one of the utterances based on one or more of training requirements, business requirements, or any other suitable parameter known to the skilled person. The chat engine 110 may also randomly select a sample utterance to generate a textual prompt. In some embodiments, the textual prompts may be generated based on one or more of the preceding textual responses alternatively or in addition to a desired conversation intent. For example, the chat engine 110 may receive a textual response indicating that the customer service representative asked the simulated customer for the customer's birthday. The chat engine 110 may then generate a textual prompt that includes the simulated customer's birthday and is based on the profile of the simulated customer. In another example, the chat engine 110 may receive a textual response indicating that the customer service representative asked the simulated customer what he or she can help the customer with. The chat engine 110 may then generate a textual prompt that includes a question for the customer service representative. This question may be generated based on one or more of training requirements, training progress, conversation intent, or any other parameter known to the skilled person. In another example, the textual prompt may be based on time. If the customer service representative has not answered in a specified time, the textual prompt may remind the representative that the simulated customer is still on the line and/or ask the representative if he/she required help.

In step 240, the text-to-speech engine 112 generates a plurality of audio prompts associated with the simulated customer. Each one of the plurality of audio prompts corresponds to one of the plurality of textual prompts. Illustratively, the computer system 102 may provide the textual prompts generated by the chat engine 110 to the text-to-speech engine 112 over the network 108. The computer system 102 may also transmit additional information to the text-to-speech engine 112, such as information based on the profile of the simulated customer. For example, the computer system 102 may transmit the simulated customer's gender and/or information related to the voice of the simulated customer to the text-to-speech engine 112. The text-to-speech engine then generates audio prompts based on the textual prompts and based on the additional information. Exemplarily, the text-to-speech engine 112 generates an audio prompt for each one of the textual prompts so that each audio prompt corresponds to a textual prompt. The text-to-speech engine 114 then may transmit the generated audio prompts back to the computer system 102 over the network 108. The audio prompts may have any audio format known to the skilled person. For example, the audio prompts may be generated and transmitted as uncompressed PCM audio, as WAV files, or as MP3 files. As described above, the text-to-speech engine 112 may be based on machine learning model.

In step 250, the computer system 102 plays each one of the plurality of audio prompts received from the text-to-speech engine 112. The computer system 102 may play the audio prompts consecutively or in any other order required by the training environment. The computer system 102 may also play the audio prompts one after the other, or it may wait for a response from the customer service representative before playing the next audio prompt. The computer system 102 may play the audio prompts in any way known to the skilled person, such as over a speaker or over a headset connected to the computer system. The computer system 102 may also play the audio prompts over a network connection. For example, the computer system 102 may transmit the audio prompts to an IP phone so that the audio prompts are then played through the phone.

In step 260, the computer system 102 receives a plurality of audio responses. The audio responses are associated with the customer service representative and may be received through any means known to the skilled person. For example, the computer system 102 may receive the audio responses via a microphone or a headset microphone connected to the computer system 102. The computer system 102 may also receive the audio responses over a network connection. For example, the computer system 102 may receive the audio responses from an IP phone that the customer service representative speaks into. Each one of the plurality of audio responses is received in response to a corresponding one of the plurality of audio prompts. Therefore, each one of the audio responses corresponds to one of the audio prompts. The audio responses may have any audio format known to the skilled person. For example, the audio responses may be received as uncompressed PCM audio, as WAV files, or as MP3 files.

In step 270, the speech-to-text engine 116 generates a plurality of textual responses from the audio responses. Like the audio responses, the textual responses are therefore associated with the customer service representative since they are generated based on the audio responses from the customer service representative. Each one of the plurality of textual responses is generated from a corresponding one of the plurality of audio responses. Illustratively, the computer system 102 may send the audio responses to the speech-to-text engine 116 over the network 108 to generate the textual responses. The speech-to-text engine 116 then, after generating the textual responses, transmits the textual responses back to the computer system 102 over the network 108.

In step 280, the computer system 102 stores the plurality of textual prompts and the plurality of textual responses in the database 118. The computer system 102 may store the textual prompts and textual responses at the end of the conversation, or the computer system 102 may continuously store the textual prompts and textual responses as soon as they are generated and/or received. The computer system 102 may also store additional data in the database 118 that is associated with the conversation. For example, the computer system 102 may store information about the customer service representative, information about the profile of the simulated customer, and/or any other information that is relevant to the training of the customer service representative.

In some embodiments, the method 200 further includes receiving and displaying feedback associated with the conversation and the training of the customer service representative. Illustratively, a trainer, such as a more senior representative or a manager, may provide feedback during the simulated conversation. To this end, the trainer has access to the textual prompts and the textual responses as they are generated and/or received. The trainer may also have access to the audio responses. The trainer can the analyze the responses given by the customer service representative and provide feedback that is based on the textual prompts and the textual responses. This feedback may be transmitted to the computer system 102, and the computer system 102 then causes display of the feedback. The feedback may be displayed by dedicated training software, or it may be displayed as part of the customer management system. The feedback may also be received and displayed in any other way known to the skilled person, such as in an instant messaging or chat application executed by the computer system 102. The feedback may be displayed immediately at the end of the conversation, or it may be displayed in real time during the conversation. For example, if the trainer needs to correct a response given by the customer service representative, the feedback associated with this correction may be displayed immediately after the representative has given the response. The customer service representative then has the chance to correct his/her response based on the received feedback. The computer system 102 may also store the feedback in the database 118.

Figure 3:
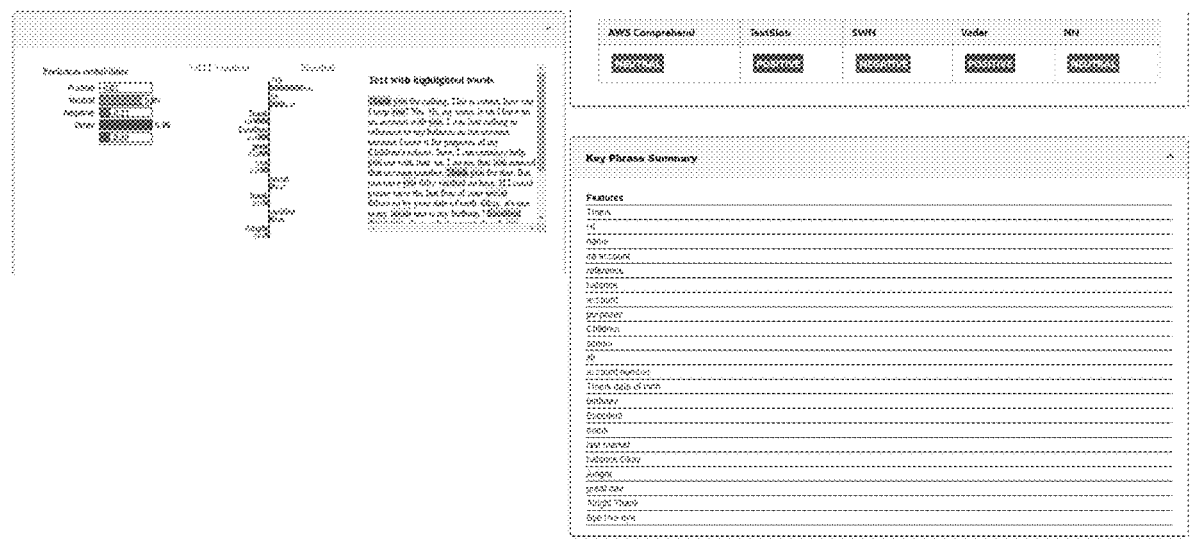
FIG. 3 is an illustration of analysis results generated by a text analysis engine in accordance with an embodiment of the present invention.

In other embodiments, the method 200 further includes analyzing the plurality of textual responses. FIG. 3 illustrates the result of such an analysis. This analysis may be performed by the text analysis engine 116. As described above, the text analysis engine may be based on a machine learning model and is coupled to the network 108. The computer system 102 may transmit the received textual responses to the text analysis engine 116 over the network 108. The computer system 102 may also execute the text analysis engine 116, so that the textual responses are transmitted internally to the computer system 102. The text analysis engine 116 then analyzes the textual responses and transmits the result of the analysis back to the computer system 102, either over the network 108 or internally. It is also expressly contemplated that a plurality of text analysis engines may be used to analyze the plurality of textual responses. In that case, the textual responses are transmitted to each of the plurality of text analysis engines. The results of the analysis are transmitted from each of the plurality of text analysis engines back to the computer system 102. The analysis may include an analysis of word choices made by the customer service representative. For example, the analysis may include the number of and/or identification of positive, negative, and neutral words chosen by the representative. The text analysis engine 116 may identify these words using sentiment analysis. After the computer system 102 has received the result of the analysis, the computer system 102 may cause display of feedback associated with the representative and based on the analysis of word choices. In an example, the computer system 102 may cause a training application to display the words uttered by the customer service representative in one of his/her responses and indicate which words had positive, negative, or neutral sentiment, as illustrated in FIG. 3. If more than one text analysis engine is used, the training application may display the analysis results of each engine, or it may combine the results of the text analysis engine in any way known to the skilled person, such as by averaging. In addition, the feedback generated by the results of the text analysis may be augmented by feedback given by a trainer that is based on the results of the text analysis. The feedback generated by the text analysis engine 116 may also be stored in the database 118.

Figure 4:
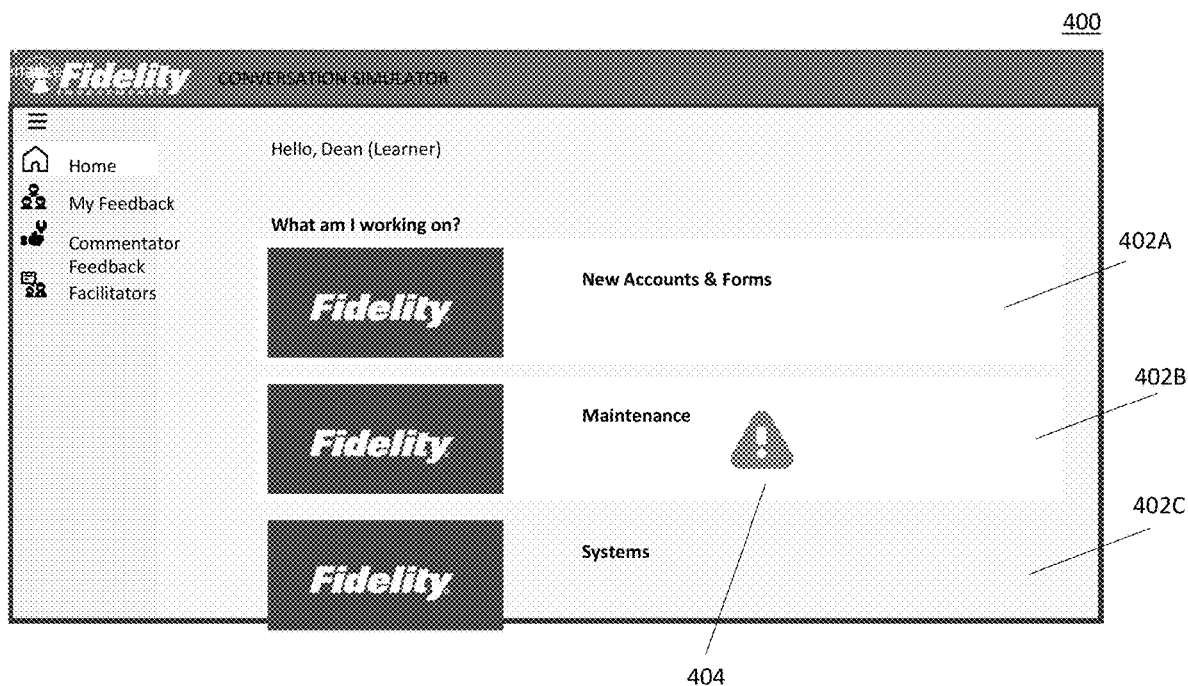
FIG. 4 is an illustration of an exemplary graphical user interface for customer representative training in accordance with an embodiment of the present invention.

FIG. 4 is an illustration of an exemplary graphical user interface 400 for customer representative training in accordance with an embodiment of the present invention. The user interface 400 includes the name of the customer service representative to be trained and different areas to start the training. For example, the representative may start a simulated conversation in area 402A of new accounts and forms, in area 402B of maintenance, or in area 402C of systems. Each one of the areas may then have sub-areas from which to select the training. Illustratively, area 402B of maintenance may have a sub-area called customer information. When the customer service representative selects area 402B, all sub-areas are displayed. The representative then selects one of the sub-areas to begin the training. Some of the sub-areas may be configured to be locked or unlocked. In this case, the representative may need to complete training in one or more prerequisite areas and/or sub-areas before he/she is able to start training a certain next sub-area. Sub-areas may only unlock when the training in all prerequisite areas is completed successfully. The user interface 400 may also include an indicator 404 that indicates that there is feedback available for the representative to review. This feedback may include any of the feedback described above, such as feedback from a trainer (senior representative or manager) or feedback generated by the text analysis engine 116. The feedback may be retrieved from database 118. The feedback may be associated with one simulated customer, or it may be associated with more than one simulated customer. There may also be more than one piece of feedback to review, with each piece related to a different simulated customer.

Figure 5:
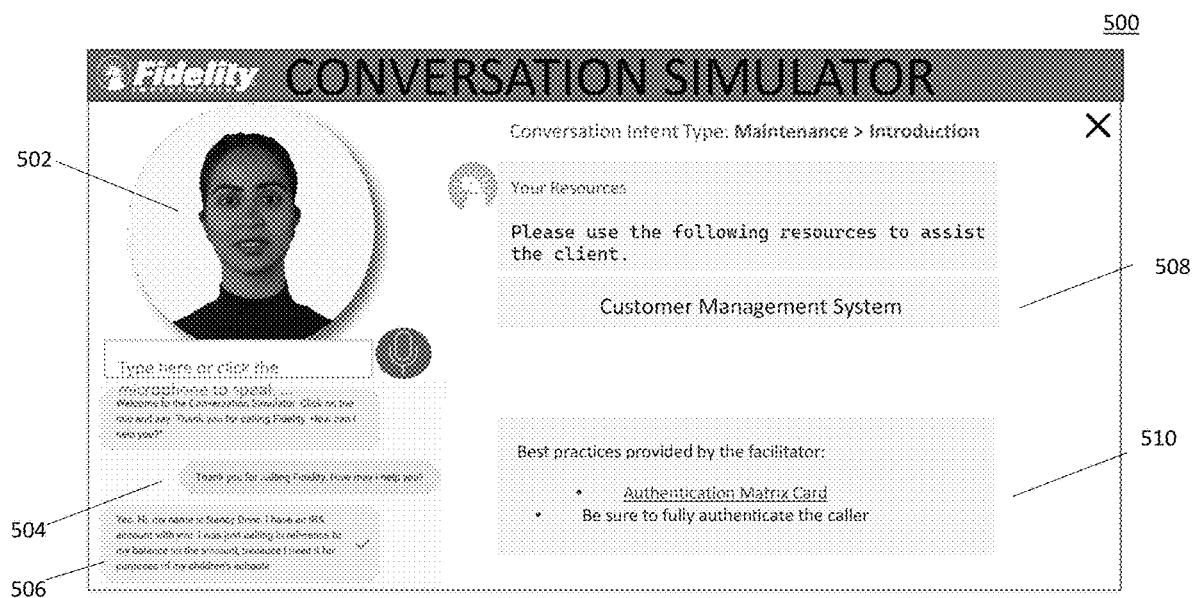
FIG. 5 is an illustration of an exemplary graphical user interface for customer representative training in accordance with an embodiment of the present invention.

FIG. 5 is an illustration of an exemplary graphical user interface 500 for customer representative training in accordance with an embodiment of the present invention. The user interface 500 may be displayed by training software after the customer service representative has selected an area for training. The user interface includes a picture 502 of the simulated customer from the profile of the simulated customer. The user interface 500 also includes one or more textual prompts and textual responses. For example, the first textual prompt may be to ask the representative to thank the simulated customer for calling and asking how he/she can help the customer. The textual response 504 associated with the customer service representative then shows that the representative executed what was asked of him/her. In response to the textual response 504, the chat engine 110 may then generate a second textual prompt 506. The second textual prompt 506 informs the customer service representative about who the simulated customer is and why the simulated customer is calling. The customer service representative may then click on button 508 to access the customer management system to further assist the simulated customer. The customer management system may be the same system that is used to assist actual customers. In that case, the information pertaining to the simulated customer has been added to the customer management system before the training session. In some embodiments, the user interface 500 may also include best practices 510. These best practices may be provided by the trainer and may include helpful tips for the simulated conversation or links to other resources.

Figure 6:
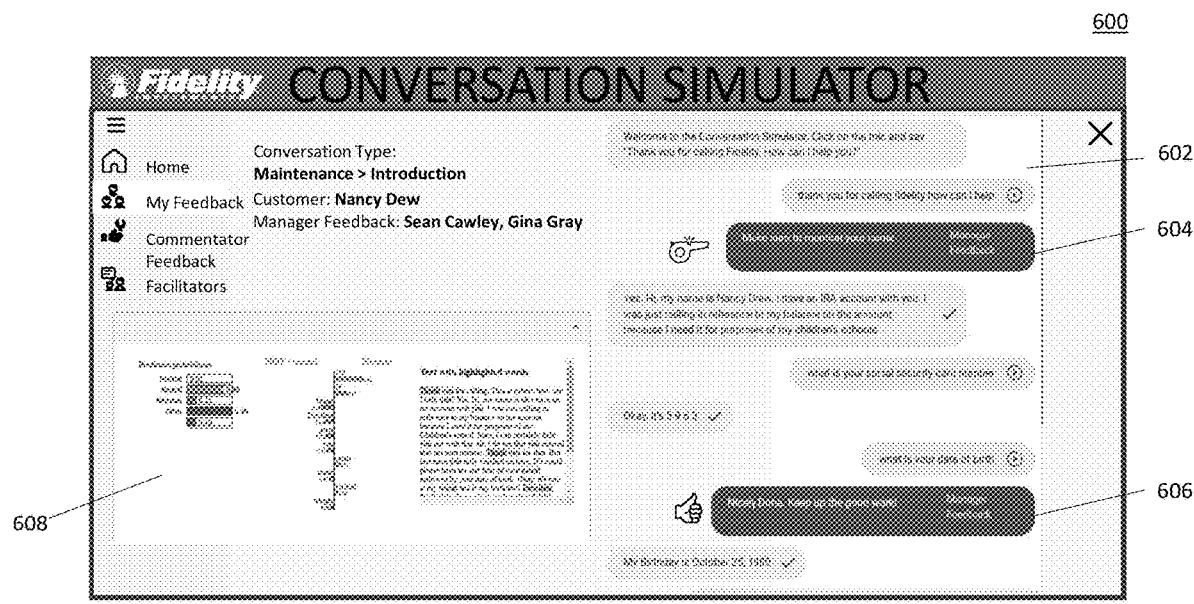
FIG. 6 is an illustration of an exemplary graphical user interface for customer representative training in accordance with an embodiment of the present invention.

FIG. 6 is an illustration of an exemplary graphical user interface 600 for customer representative training in accordance with an embodiment of the present invention. FIG. 6 shows simulated conversation 602 that includes textual prompts and textual responses, as generated by the chat engine 110 and received from the customer service representative. Also shown in FIG. 6 are various types of feedback that may be given to the customer service representative. Feedback 604 and 606 is feedback given by the trainer, such as by the manager or a senior representative. This feedback may be given in real time during the conversation. For example, after the representative thanked the simulated customer for calling, feedback response 604 reminds the representative of mentioning his/her name when greeting the customer, which the representative failed to do. Then, after the representative successfully and correctly authenticated the customer, feedback response 606 shows positive feedback for a task well performed. Also shown in user interface 600 is the sentiment analysis feedback 608 that has been generated by the text analysis engine 116, as described above.

Figure 7:
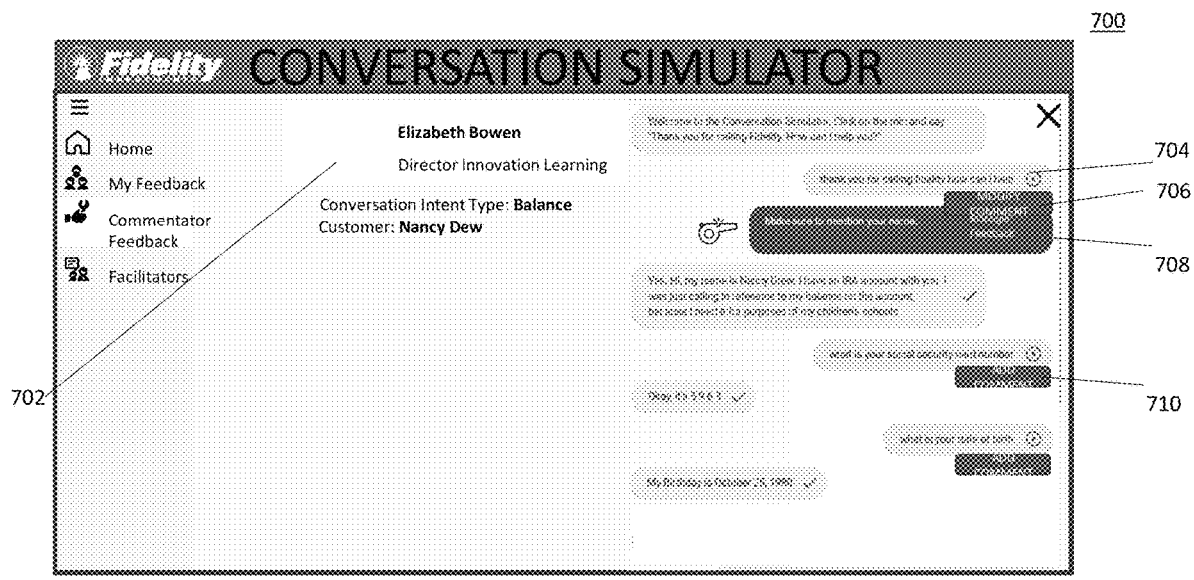
FIG. 7 is an illustration of an exemplary graphical user interface for customer representative training in accordance with an embodiment of the present invention.

FIG. 7 is an illustration of an exemplary graphical user interface 700 for customer representative training in accordance with an embodiment of the present invention. FIG. 7 illustrates a trainer's view of a simulated conversion. The user interface 700 includes an identification 702 of the customer service representative, the name of the simulated customer, and a brief description of the conversation type, such as a balance inquiry. The user interface 700 also shows the simulated conversation, including textual prompts and textual responses, such as response 704. The user interface then allows the trainer to add or modify feedback. For example, button 706 allows the trainer to modify a comment that had been already added to response 704. Button 706 allows to modify feedback comment 708, which reminds the representative to state his/her name. Other buttons, such as button 710, allow the trainer to add feedback comments to the other textual responses. The feedback comments may be stored in the database 118. The feedback given by the trainer can then be reviewed by the customer service representative, for example in a view as illustrated in FIG. 6. While FIG. 7 shows adding feedback that is displayed to a customer service representative immediately after a simulated conversation has ended, it is also expressly contemplated that a trainer may provide feedback in real time during an ongoing simulated conversation. In that case, the user interface 700 may display textual prompts and textual responses in real time as they are generated and/or received. The user interface 700 may also then add respective buttons for adding feedback and/or modifying feedback to allow the trainer to comment on the representative's performance in real time. This feedback may then be displayed to the representative while the simulated conversation is ongoing.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for customer service representative training via a conversation with a simulated customer using a computer system associated with a customer service representative, a chat engine, a text-to-speech engine, and a speech-to-text engine, wherein the computer system, the chat engine, the text-to-speech engine, and the speech-to-text engine are coupled to a communications network, the method comprising:
   receiving, by the computer system, a profile of a simulated customer;
   causing display, by the computer system, of the profile of the simulated customer;
   generating, by the chat engine, a plurality of textual prompts associated with the simulated customer and based on the profile of the simulated customer;
   generating, by the text-to-speech engine, a plurality of audio prompts associated with the simulated customer, each one of the plurality of audio prompts corresponding to one of the plurality of textual prompts, including adjusting one or more vocal characteristics of simulated speech in the plurality of audio prompts based upon information related to the voice of the simulated customer from the profile of the simulated customer;
   playing, by the computer system, each one of the plurality of audio prompts;
   receiving, by the computer system, a plurality of audio responses associated with the customer service representative, wherein each one of the plurality of audio responses is received in response to a corresponding one of the plurality of audio prompts;
   generating, by the speech-to-text-engine, a plurality of textual responses associated with the customer service representative, wherein each one of the plurality of textual responses corresponds to one of the plurality of audio responses;
   analyzing, by the computer system, the plurality of textual responses associated with the customer service representative to generate feedback for the customer service representative, including determining a sentiment associated with each of a plurality of words in each textual response and annotating each textual response using the determined sentiments; and
   storing the plurality of textual prompts and the plurality of annotated textual responses in a database.

2. The computer-implemented method of claim 1, wherein the profile of the simulated customer is based at least in part on one or more profiles of existing customers.

3. The computer-implemented method of claim 2, wherein the profile of the simulated customer is displayed by a customer management system running on the computer system, and wherein the customer management system is also configured to display profiles of existing customers.

4. The computer-implemented method of claim 1, wherein the text-to-speech engine is based on a machine learning model.

5. The computer-implemented method of claim 1, wherein the chat engine is based on a combination of a machine learning model and natural language processing.

6. The computer-implemented method of claim 1, further comprising causing display, by the computer system, of the feedback in real-time immediately at a conclusion of the conversation.

7. The computer-implemented method of claim 1, wherein analyzing the plurality of textual responses associated with the customer service representative to generate feedback for the customer service representative further comprises:
   providing a text analysis engine based on a machine learning model and coupled to the communications network; and
   analyzing, by the text analysis engine, the plurality of textual responses.

8. The computer-implemented method of claim 7, wherein the analysis includes an analysis of word choices, and further comprising causing display, by the computer system, the feedback associated with the customer service representative and based on the analysis of word choices.

9. The computer-implemented method of claim 1, wherein at least one of the plurality of textual prompts is further based on a preceding one of the plurality of textual responses.

10. A system for customer service representative training via a conversation with a simulated customer using a chat engine, a text-to-speech engine, and a speech-to-text engine, wherein the chat engine, the text-to-speech engine, and the speech-to-text engine are coupled to a communications network, the system comprising:
    a computer system associated with a customer service representative, coupled to the communications network, and having a processor coupled to memory, the processor configured to:
    receive a profile of a simulated customer;
    cause display of the profile of the simulated customer;
    receive, from the text-to-speech engine, a plurality of audio prompts associated with the simulated customer generated by the text-to-speech engine, wherein each one of the plurality of audio prompts corresponds to one of a plurality of textual prompts associated with the simulated customer and generated by the chat engine based on the profile of the simulated customer, including adjusting, by the text-to-speech engine, one or more vocal characteristics of simulated speech in the plurality of audio prompts based upon information related to the voice of the simulated customer from the profile of the simulated customer;
    play each one of the plurality of audio prompts;
    receive a plurality of audio responses associated with the customer service representative, wherein each one of the plurality of audio responses is received in response to a corresponding one of the plurality of audio prompts; and
    analyze a plurality of textual responses associated with the customer service representative and generated by the speech-to-text engine from the plurality of audio responses to generate feedback for the customer service representative, including determining a sentiment associated with each of a plurality of words in each textual response and annotating each textual response using the determined sentiments, wherein each one of the textual responses corresponds to one of the plurality of audio responses;

store the plurality of textual prompts and the plurality of annotated textual responses in a database.

11. The system of claim 10, wherein the profile of the simulated customer is based at least in part on one or more profiles of existing customers.

12. The system of claim 11, wherein the profile of the simulated customer is displayed by a customer management system running on the computer system, and wherein the customer management system is also configured to display profiles of existing customers.

13. The system of claim 10, wherein the text-to-speech engine is based on a machine learning model.

14. The system of claim 10, wherein the chat engine is based on a combination of a machine learning model and natural language processing.

15. The system of claim 10, wherein the processor is further configured to cause display of the feedback in real-time immediately at a conclusion of the conversation.

16. The system of claim 10, wherein the system further comprises a text analysis engine coupled to the communications network and based on a machine learning model, the text analysis engine configured to perform the analysis of the plurality of textual responses associated with the customer service representative to generate the feedback for the customer service representative.

17. The system of claim 10, wherein at least one of the plurality of textual prompts is further based on a preceding one of the plurality of textual responses.

18. A non-transitory computer-readable medium having software encoded thereon, the software, when executed by one or more processors operable to:
   receive, by a computer system associated with a customer service representative, a profile of a simulated customer;
   cause display, by the computer system, of the profile of the simulated customer;
   generate, by a chat engine, a plurality of textual prompts associated with the simulated customer and based on the profile of the simulated customer;
   generate, by a text-to-speech engine, a plurality of audio prompts associated with the simulated customer, each one of the plurality of audio prompts corresponding to one of the plurality of textual prompts, including adjusting one or more vocal characteristics of simulated speech in the plurality of audio prompts based upon information related to the voice of the simulated customer from the profile of the simulated customer;
   play, by the computer system, each one of the plurality of audio prompts;
   receive, by the computer system, a plurality of audio responses associated with the customer service representative, wherein each one of the plurality of audio responses is received in response to a corresponding one of the plurality of audio prompts;
   generate, by the speech-to-text-engine, a plurality of textual responses associated with the customer service representative, wherein each one of the plurality of textual responses corresponds to one of the plurality of audio responses;
   analyze, by the computer system, the plurality of textual responses associated with the customer service representative to generate feedback for the customer service representative, including determining a sentiment associated with each of a plurality of words in each textual response and annotating each textual response using the determined sentiments; and
   store the plurality of textual prompts and the plurality of annotated textual responses in a database.

* * * * *